United States Patent [19]

Sule

[11] Patent Number: 4,496,133

[45] Date of Patent: Jan. 29, 1985

[54] PINCH VALVE ASSEMBLY

[76] Inventor: Akos Sule, 4 Gates Ave., Roseland, N.J. 07068

[21] Appl. No.: 354,053

[22] Filed: Mar. 2, 1982

[51] Int. Cl.$^3$ .............................................. F16K 7/04
[52] U.S. Cl. ...................................... 251/7; 137/595; 251/129
[58] Field of Search ................ 251/5, 7, 129; 137/595

[56] References Cited

U.S. PATENT DOCUMENTS

| | | | |
|---|---|---|---|
| 3,264,067 | 8/1966 | Alderfer | 251/7 X |
| 3,511,469 | 5/1970 | Bell | 251/7 |
| 3,823,724 | 7/1974 | Davis | 251/5 X |
| 4,259,985 | 12/1978 | Bergmann | 137/595 |
| 4,354,984 | 10/1982 | Richardson | 251/7 X |

FOREIGN PATENT DOCUMENTS

| | | | |
|---|---|---|---|
| 932736 | 7/1963 | United Kingdom | 251/7 |
| 1225835 | 3/1971 | United Kingdom | 251/7 |

Primary Examiner—Robert G. Nilson
Attorney, Agent, or Firm—Bernard Malina

[57] ABSTRACT

A pinch valve assembly includes a valve body in which a plunger is spring loaded against a portion of a flexible tube which passes through the valve body. The plunger causes the flexible tube to collapse preventing flow through the tube. Energization of a solenoid which is mounted on the valve body causes the plunger to release the tube, permitting flow. In an alternative embodiment, energization of the solenoid causes the plunger to bear on the flexible tube thereby providing a normally open valve arrangement.

In another alternative embodiment the plunger bears on a plurality of flexible tubes thereby facilitating simultaneous control of different fluids.

8 Claims, 12 Drawing Figures

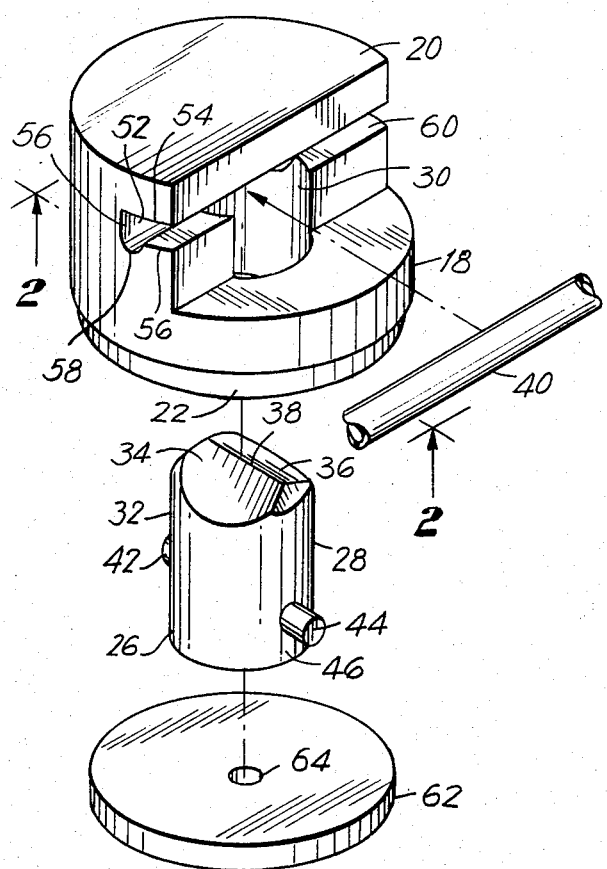
FIG.1
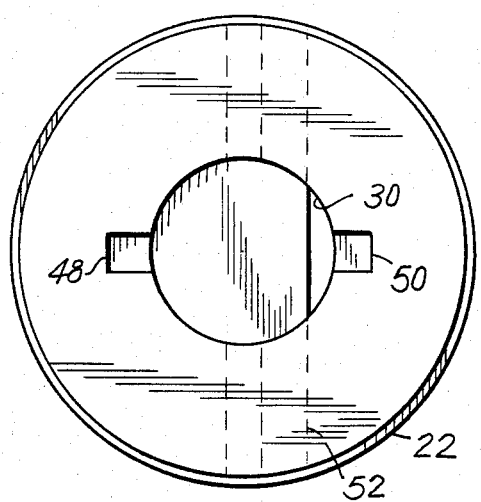
FIG.2
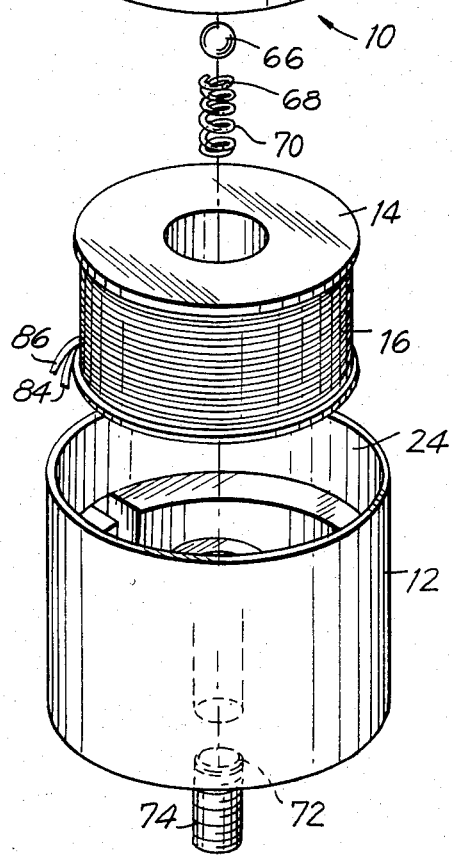
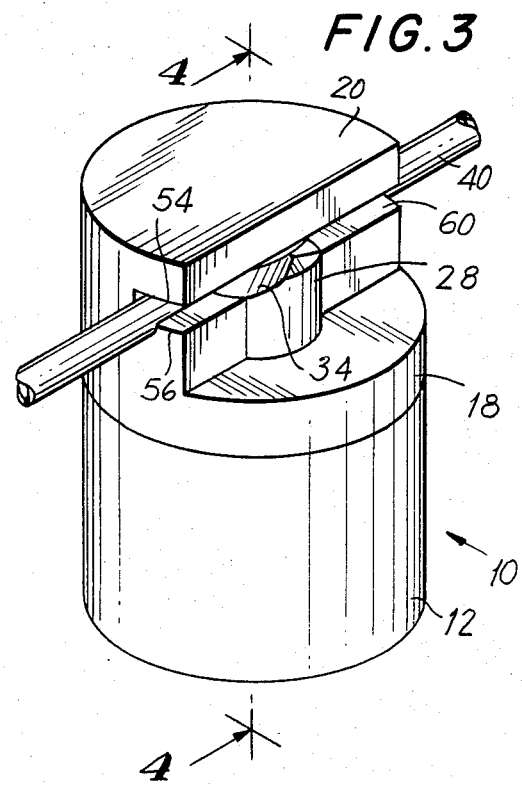
FIG.3

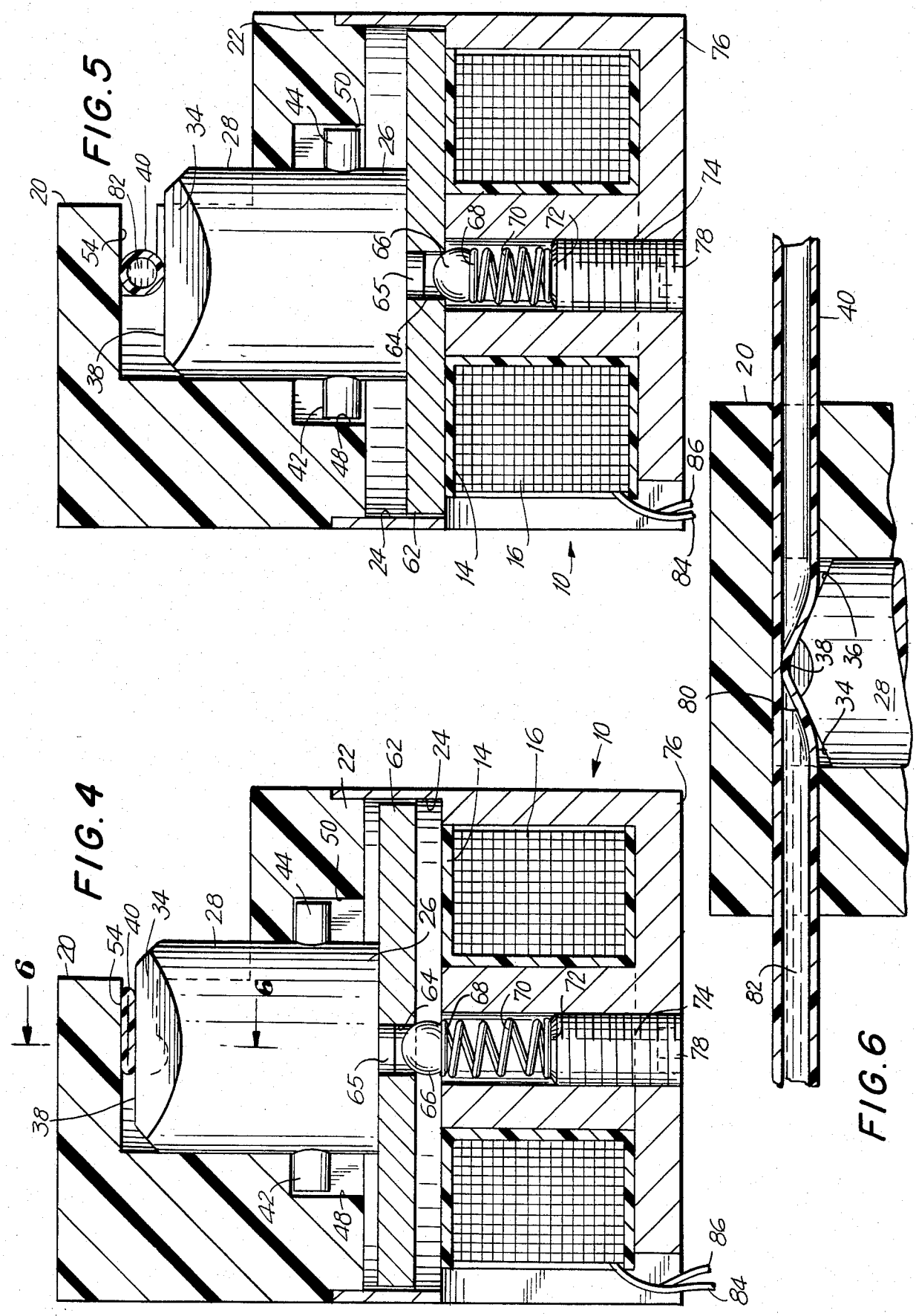

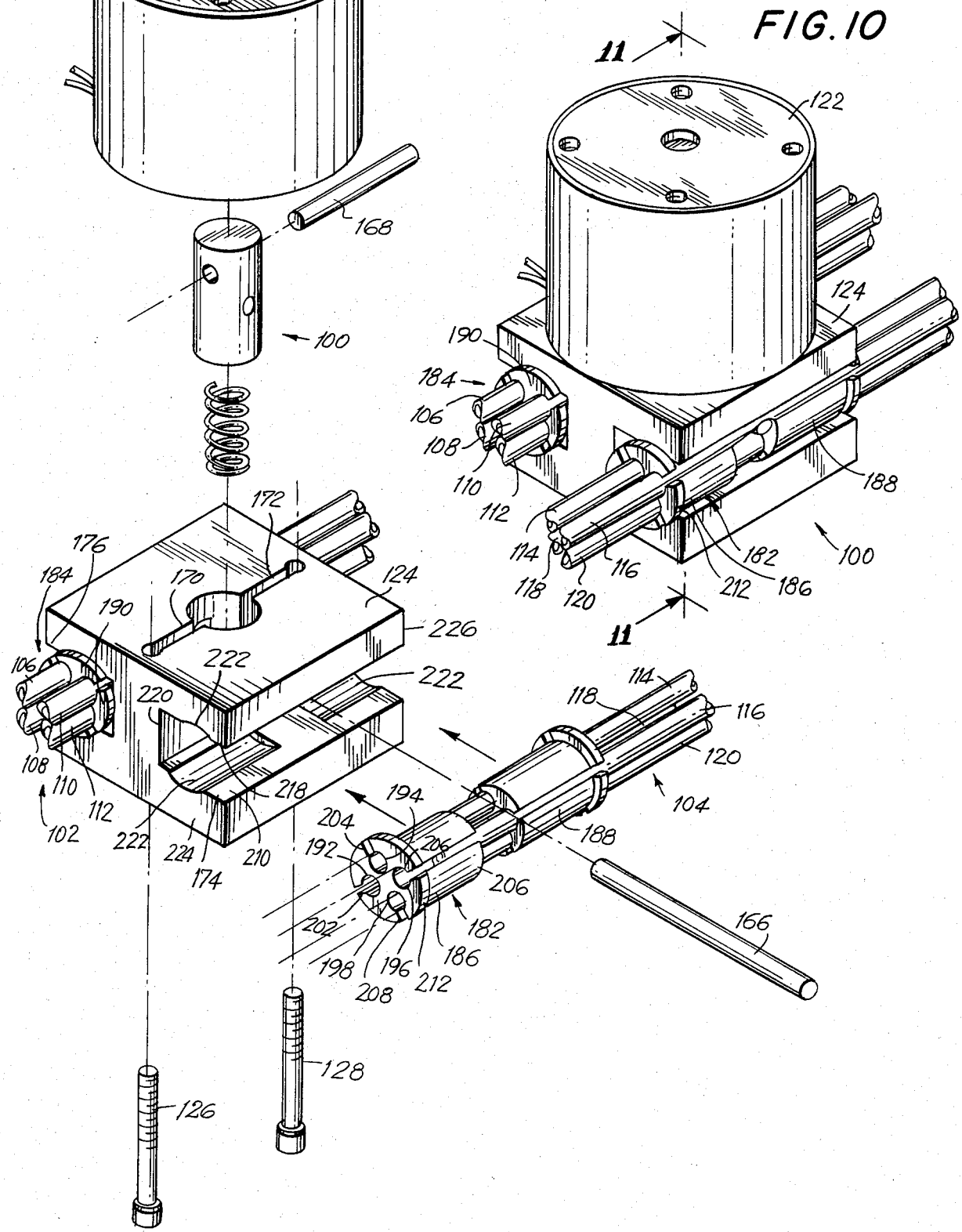

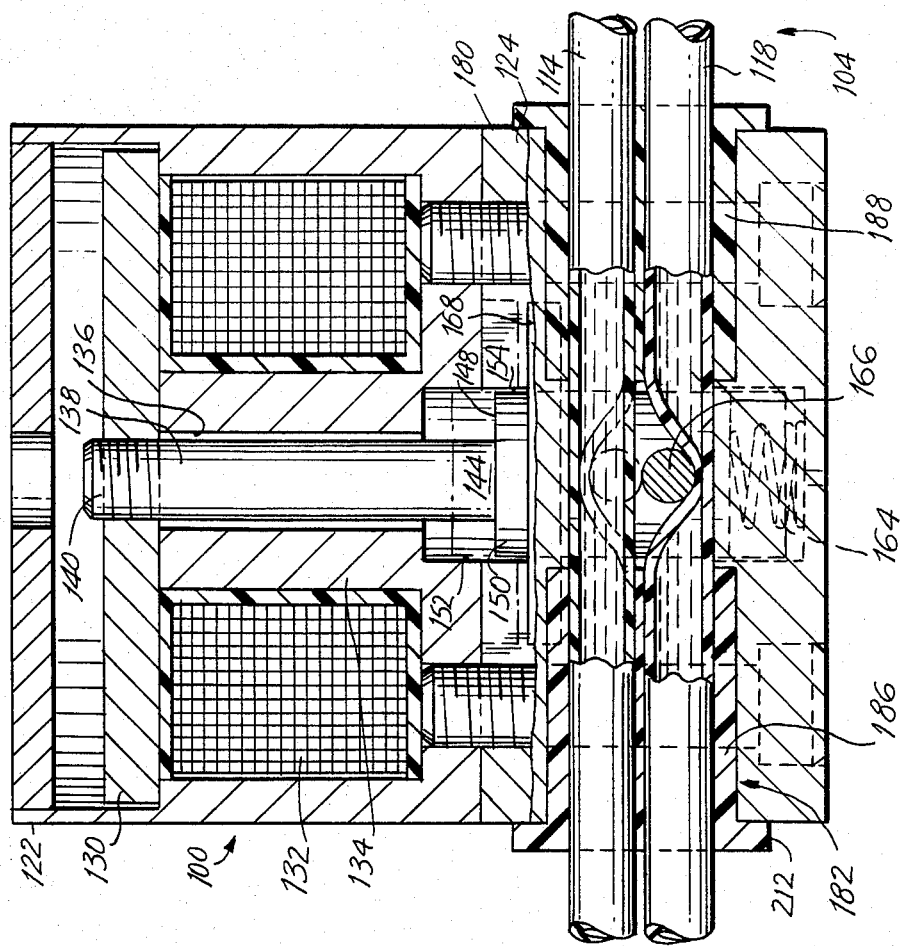
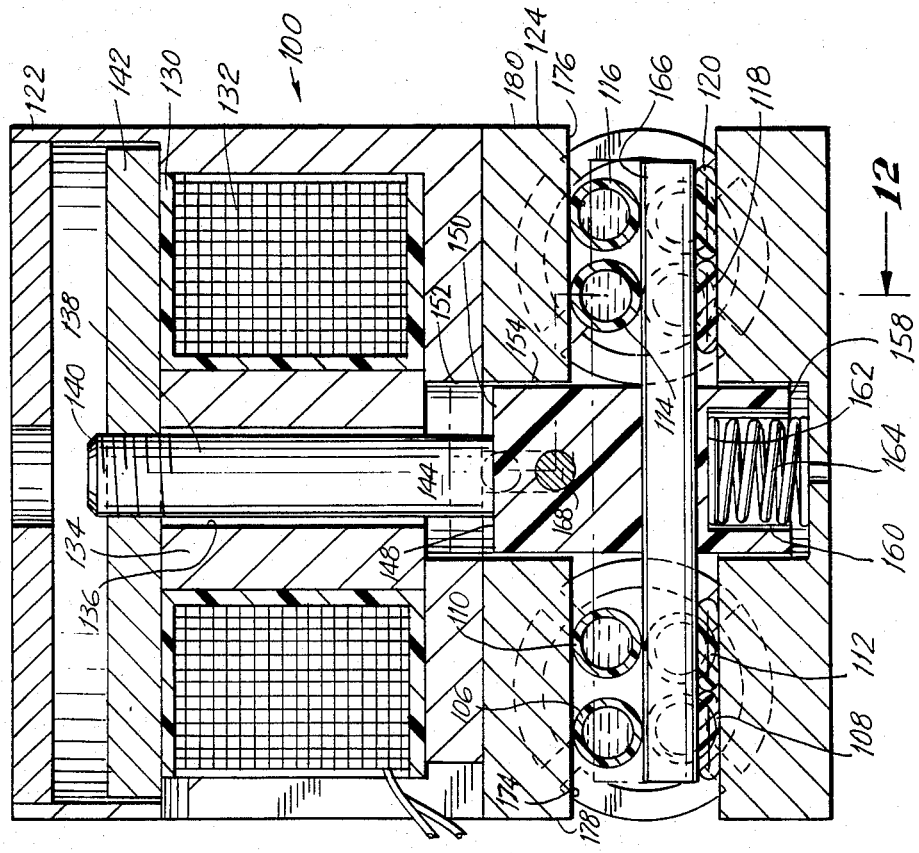

PINCH VALVE ASSEMBLY

BACKGROUND OF THE INVENTION

Recent developments in the fields of computer driven hydraulic and pneumatic equipment coupled with research needs in medical instrumentation has resulted in a requirement for an efficient electrically operated pinch valve which operates in conjunction with flexible tubing. This type of valve is needed in order to ensure that the fluid flowing in the tubing is not contaminated by contact with components of the control valve, as would be the case if conventional solenoid valves were utilized. This need is present in medical instrumentation in which it is extremely important to maintain the fluid or gas in a sterile and uncontaminated condition.

Another application of this type of valve is related to the pumping and control of corrosive liquids or gases. Such liquids or gases contribute toward the damage of conventional control valves, resulting in unwanted leakage and a need for costly and time consuming replacement of the control valve.

It is desirable that pinch type valves used with flexible tubing be capable of being installed on tubing which is already in place, without a need for securing and passing the end of the tubing through the valve. This makes it possible to install such pinch valves quickly and in the case of experimental equipment makes it possible to modify such equipment without a need for total disassembly.

Another need which exists in the field of hydraulic and pneumatic equipment is for simultaneous and reliable control of two or more fluids or gases which may not mix.

OBJECTS OF THE INVENTION

It is an object of the present invention to provide an electrically operated pinch valve assembly.

Another object of the present invention is to provide a pinch valve assembly capable of being easily installed on an intermediate portion of flexible tubing without a need for access to an end of the tubing.

Another object of the present invention is to provide a pinch valve assembly which has operating members which are relatively light in weight, thereby requiring relatively low power consumption, which in turn facilitates incorporation of the pinch valve assembly in low-power electronic circuitry.

Another object of the present invention is to provide a solenoid operated pinch valve assembly which is normally closed when un-energized. Another object of the present invention is to provide a pinch valve assembly which is normally open when un-energized.

Another object of the present invention is to provide a pinch valve assembly which is capable of simultaneously controlling a plurality of different fluids.

Another object of the present invention is to provide a pinch valve assembly which is capable of controlling a plurality of different fluids and providing a normally closed condition for selected fluids and a normally open condition for other fluids.

Another object of the present invention is to provide a pinch valve assembly which is capable of controlling corrosive liquids or gases without danger of leakage or damage to the valve.

Still another object of the present invention is to provide a pinch valve which comprises a small number of relatively simple parts which can be manufactured at a relatively low cost.

SUMMARY OF THE INVENTION

In accordance with the present invention, there is provided a pinch valve assembly which includes a solenoid housing which is mounted on a valve body. The solenoid housing encloses a coil bobbin and a solenoid coil. A helical compression spring is disposed in a bore formed in the coil bobbin and the spring supports a disk which is made of a magnetic material. The disk supports a pressure block which has a pair of alignment pins which ride in grooves formed in the valve body and maintains the rotational alignment of the pressure block with respect to the valve body. In the unactuated state the action of the spring causes the top surface of the pressure block to bear against a flexible tube which is inserted between the pressure block and an overhanging portion of the valve body and causes the tube to collapse, thereby preventing flow through the tube. When the solenoid coil is actuated, the disk is drawn downward, against the action of the spring, and the pressure block releases the tubing allowing the tubing to open and permitting flow through the tubing.

In an alternative embodiment of the invention, a plurality of flexible tubes are acted upon by a pressure pin which is mounted on a plunger which is controlled by a solenoid.

In another alternative embodiment of the invention the valve is normally open and energization causes the valve to close.

BRIEF DESCRIPTION OF THE DRAWINGS

Additional objects and advantages of the invention will become apparent during the course of the following specification when taken in connection with the accompanying drawings in which:

FIG. 1 is an exploded view of a pinch valve assembly made in accordance with the present invention;

FIG. 2 is a bottom view of the valve body portion of the pinch valve assembly of FIG. 1, taken along the line 2—2 of FIG. 1;

FIG. 3 is an overall perspective view of the pinch valve of FIG. 1;

FIG. 4 is a cross-sectional view taken along the line 4—4 of FIG. 3, with the pinch valve assembly shown in the closed position;

FIG. 5 is a cross-sectional view similar to FIG. 4 showing the pinch valve assembly in the open position;

FIG. 6 is a fragmentary cross-sectional view taken along the line 6—6 of FIG. 4;

FIG. 9 is an exploded view of an alternative embodiment of the pinch valve assembly of FIG. 1;

FIG. 10 is an overall perspective view of the pinch valve assembly of FIG. 9;

FIG. 11 is a cross-sectional view taken along the line 11—11 of FIG. 10, and

FIG. 12 is a cross-sectional view taken along the line 12—12 of FIG. 11.

DETAILED DESCRIPTION OF THE INVENTION

Figure 7:
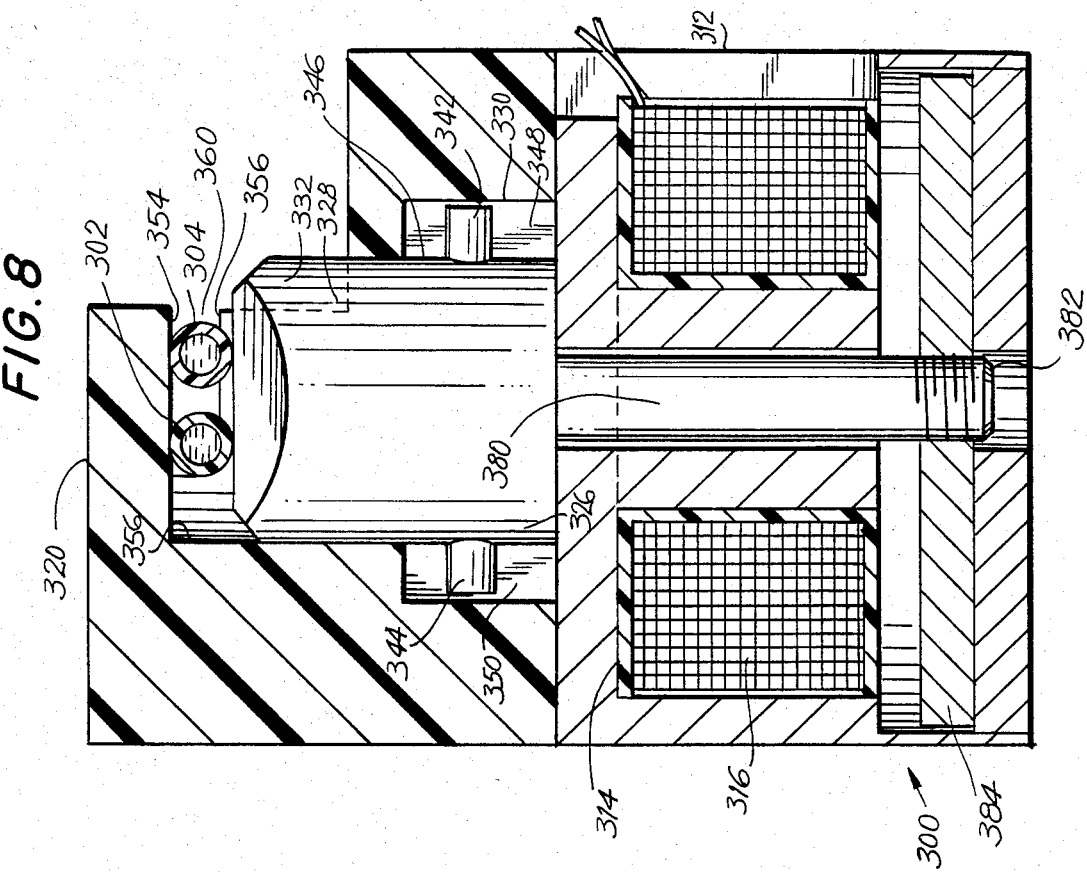
FIG. 7 is a cross-sectional view of a double tube normally open valve assembly in the energized position.

With reference to the drawings, there is shown in FIGS. 1-6 a pinch valve assembly 10 made in accordance with the present invention, which comprises a hollow solenoid housing 12 which contains a magnetizable solenoid bobbin 14 and a solenoid coil 16. The solenoid housing 12 is mounted on the lower portion 18 of a valve body 20 by means of a stepped-down portion 22 of the valve body 20 which is press fit into a recessed portion 24 of the solenoid housing 12.

The lower portion 26 of a pressure block 28 is mounted in a central cavity 30 of the valve body 20. The pressure block 28 is generally cylindrical, and the upper end 32 has a pair of chamfered portions 34, 36 which meet forming a slightly rounded central portion 38. In use, the upper end 32 of the pressure block 28 bears on a flexible tube 40 as is best shown in FIG. 6. The lower portion 26 of the pressure block 28 includes a pair of diametrically opposed pin members 42, 44 which project outwardly from the surface 46 of the pressure block 28. The pin members 42, 44 may be in general alignment with the central portion 38 and the pin members 42, 44 are received in a pair of slots 48, 50 formed in the lower portion of the valve body 20. The slots 48, 50 maintain the rotational alignment of the pressure block 28 and ensure that the central portion 38 is maintained substantially perpendicular to the longitudinal axis of the tubing 40.

The flexible tubing 40 is mounted in a groove 52 which extends diametrically across the valve body 20. The groove 52 is defined by a horizontal top surface 54, a vertical back wall 56, and a horizontal lower surface 56 which includes a cylindrically curved portion 58. The curvature of the cylindrically curved portion 58 conforms to the outer radius of the flexible tubing 40 and aids in retaining the flexible tubing 40 within the groove 52. The open portion 60 of the groove facilitates insertion or removal of the flexible tubing 40 from the pinch valve assembly 10.

The lower portion 26 of the pressure block 28 is mounted on a circular disk 62 which has a central hole 64. The pressure block 28 is provided with a cylindrical projection 65 which is force fitted into the disk 62 to fixedly and centrally connect disk 62 to the pressure block 28. In the unactuated state, as is shown in FIG. 4, the disk 62 rests on a force ball 66 which is lodged in the hole 64. The force ball 66 rests on the upper end 68 of a helical compression spring 70 which is supported by the upper end 72 of an adjustment screw 74. The adjustment screw 74 is threaded into a bottom portion 76 of the solenoid housing 12 and has a socket 78, shown in broken lines, which enables an operator to adjust the vertical position of spring 70 and consequently the vertical pressure applied to the pressure block 28. In normal use, the screw 74 is adjusted so that in the unactuated state the pressure block 28 causes the portion 80 of the flexible tube 40 to collapse, as is shown in FIGS. 4 and 6, thereby preventing flow of fluid 82 through flexible tube 40. The pinch valve assembly 10 is thus normally closed.

When the solenoid coil 16 is energized via the leads 84, 86, the disk 62 which is made of a magnetic material, is drawn downward against the action of the spring 70 and the force on the flexible tubing 40 is released, causing the tubing to open, as is shown in FIG. 5, and permitting flow through the tubing 40.

Figure 8:
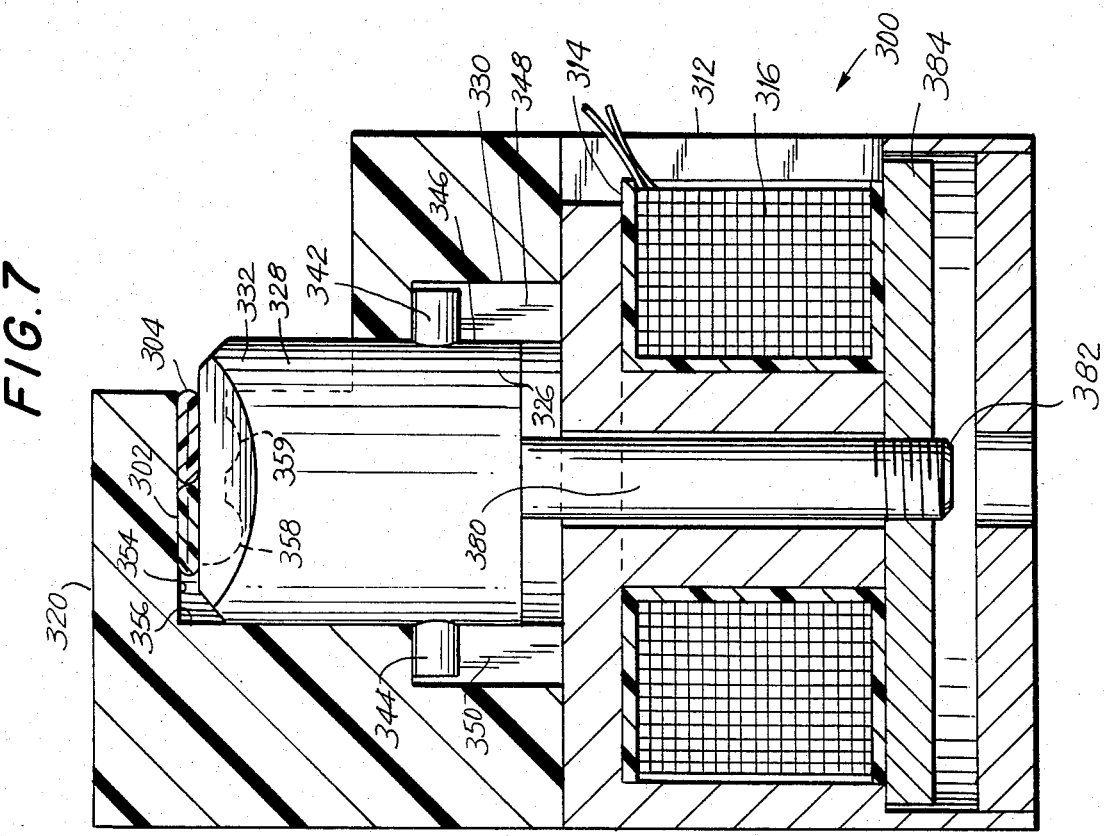
FIG. 8 is a cross-sectional view of a double tube normally open valve assembly in the de-energized position.

FIGS. 7 and 8 show an alternative embodiment 300 of the invention which is normally open and which utilizes a pair of tubes 302, 304, thereby facilitating simultaneous control of two different fluids. The pinch valve 300 comprises a hollow solenoid housing 312 which contains a solenoid bobbin 314 and a solenoid coil 316. The solenoid housing 312 is mounted on the lower portion 318 of a valve body 320.

The lower portion 326 of a pressure block 328 is mounted in a central cavity 330 of the valve body 320. The pressure block 328 is generally cylindrical, and the upper end 332 has a pair of chamfered portions 334, 336 generally similar to the chamfered portions 34, 36 of the pressure block 28 shown in FIG. 1. Only the chamfered portion 334 is shown in FIGS. 7 and 8. In use, the upper end 332 of the pressure block 328 bears on a pair of flexible tubes 302, 304 as is shown in FIGS. 7 and 8. The lower portion 326 of the pressure block 328 includes a pair of diametrically opposed pin members 342, 344 which project outwardly from the surface 346 of the pressure block 328 generally similar to the pin members 42, 44 of the pressure 28 shown in FIG. 1. The pin members 342, 344 are in general alignment with the central portion 338 which is similar to the central portion 38 of FIG. 1 and the pin members 342, 344 are received in a pair of slots 348, 350 formed in the lower portion of the valve body 320. The slots 348, 350 maintain the rotational alignment of the pressure blocks 328 and ensure that the central portion 338 is maintained substantially perpendicular to the longitudinal axes of the tubes 302, 304.

The flexible tubes 302, 304 are mounted in a groove 352 which extends diametrically across the valve body 320. The groove 352 is defined by a horizontal top surface 354, a vertical back wall 356, and a horizontal lower surface 356 which includes cylindrically curved portions 358, 359. The curvature of the cylindrically curved portions 358, 359 conforms substantially to the outer radii of the flexible tubes 302, 304 and aids in retaining the flexible tubes 302, 304 within the groove 352. The open portion 360 of the groove facilitates insertion or removal of the flexible tubes 302, 304 from the pinch valve assembly 300.

The lower portion 326 of the pressure block 328 is connected to a centrally located shaft 380. The lower portion 382 of the shaft 380 (which is of non-magnetizable material) is threaded into a disk 384 which is made of a magnetic material. The position of the disk 384 may be adjusted so that in the energized state the pressure block 328 causes the tubes 302, 304 to collapse as is shown in FIG. 7, thereby preventing the flow of fluid through the tubes.

When the solenoid coil 316 is un-energized, the disk 384 is forced by tube 302, 304 resilience and internal pressure as is shown in FIG. 8, permitting tubes 302, 304 to open. The pinch valve assembly 300 is thus normally open.

FIGS. 9-12 show an alternative embodiment 100 of the invention which utilizes two groups 102, 104 of multiple flexible tubes 106, 108, 110, 112, 114, 116, 118, 120, thereby facilitating control of different fluids using a single valve or, alternatively, the control of a relatively large quantity of fluid using a relatively small valve. The pinch valve assembly 100 comprises a hollow solenoid housing 122 which is mounted on a valve body 124 by means of a pair of screws 126, 128 as is shown in FIG. 9.

A solenoid bobbin 130 and a solenoid coil 132 are mounted in the solenoid housing 122. The housing 122 includes a central hub 134 portion which has a central bore 136. An armature shaft 138 slides within the bore 136 and the upper portion 140 of the armature shaft 138 is threaded into a disk 142 which is made of a magnetic material. The lower end 144 of the armature shaft 138 rests on the top surface 148 of a plunger 150. The plunger 150 slides within aligned bores 152, 154 formed in the bottom portion of the solenoid housing 122 and the valve body 124. The lower surface 158 of the plunger 150 has a bore 160 which receives the upper end 162 of a helical compression spring 164. The plunger 150 has a pressure pin 166 which passes through the plunger 150 and which bears on the flexible tubes 106, 108, 110, 112, 114, 116, 118, 120 in a manner which will be described presently. The plunger 150 also has an alignment pin 168 which also passes through the plunger 150 and which rides in an aligned pair of slots 170, 172 which are formed in the valve body 124. The orientation of the alignment pin 168 is perpendicular to the pressure pin 166 and the orientation of the slots 170, 172 is such that the orientation of the pressure pin 166 is maintained perpendicular to the longitudinal axes of the tubes 106, 108, 110, 112, 114, 116, 118, 120.

The tubes 106, 108, 110, 112, 114, 116, 118, 120 are each formed of a resilient elastomeric or plastic material and are disposed in two groups 102, 104 of four each in the channels 174, 176 which are formed in the sides 178, 180 of the valve body 124. Each group 102, 104 of four tubes is held in place by a pair of tube retainers 182, 184 which are best shown in FIGS. 9 and 10. The four tube retainers, three of which are shown 186, 188, 190, are identical and only the tube retainer designated by the reference numeral 186 will be described in detail. The tube retainer 186 has four bores 192, 194, 196, 198 which are proportioned to accommodate the four tubes 114, 116, 118, 120. Each bore communicates with the outer surface 206 of the tube retainer 186 by means of a groove 202, 204, 206, 208. The grooves 202, 204, 206, 208 facilitate installing the tube retainer 186 on an intermediate portion 210 of the tubes 114, 116, 118, 120 and eliminate the need for access to the ends of the tubes, which may be remote and inconvenient. The outer surface 206 of the tube retainer 186 is cylindrical and has an integrally formed flange 212 portion at the end 214.

The channels 174, 176 are similar in configuration, although of opposite hand, and only the channel 174 will be described in detail. The channel 174 includes a horizontal lower surface 216, a horizontal upper surface 218, and a vertical back surface 220. The upper and lower surfaces 216, 218 each have a pair of semi-cylindrical grooves 222. The grooves are semi-cylindrical in configuration with a radius of curvature which corresponds to the radius of curvature of the surface 206 of the tube retainer 186. When installed, the surface 206 of the tube retainer 186 is lodged in the semi-cylindrical grooves 222 and the flanges 212 abut the front and back surfaces 224, 226 of the valve body 124.

When the solenoid coil 132 is energized, the disk 142 is drawn downward as is shown in FIGS. 11 and 12, draws the plunger 150 downward, compressing the spring 164 and moving the pressure pin 166 downward, collapsing the lower tubes 108, 112, 118, 120 and leaving the upper tubes 106, 110, 114, 116 open. In the energized state, the fluid can flow through the upper tubes but is prevented from flowing through the lower tubes. When the solenoid coil 132 is non-energized, the disk rises due to the action of the spring 164 bearing on the plunger 150. The pressure pin 166 causes the upper tubes 106, 110, 114, 116 to collapse while leaving the lower tubes 108, 112, 118, 120 open. The pinch valve assembly thus accomplishes its function of providing a normally open, and a normally closed flow control capability for selected fluids simultaneously.

While preferred embodiments of the invention have been shown and described herein, it is obvious that numerous additions, changes and omissions may be made in such embodiments without departing from the spirit and scope of the invention.

What is claimed is:

1. A pinch valve assembly comprising a valve body,
a solenoid housing mounted on said valve body,
a solenoid coil mounted in said solenoid housing with said solenoid coil having a central bore,
spring means disposed in said central bore,
armature means supported by said spring means,
a plunger member supported by said armature means,
guide means disposed on said valve body and disposed to guide said plunger relative to said valve body, with said guide means comprising a pin member projecting from the surface of said plunger and slideably disposed with respect to a slot formed in said valve body,
resilient tubing means disposed between said plunger and said valve body and with said spring means disposed to force said plunger against said tubing means and said tubing means against said valve body causing said tubing means to collapse and preventing flow through said tubing means until said solenoid coil is electrically energized, thereby drawing said armature means toward said solenoid, releasing said tubing means, and permitting flow through said tubing means.

2. A pinch valve assembly according to claim 1 in which said spring means comprises a helical compression spring.

3. A pinch valve assembly according to claim 1 in which said plunger member has an end portion with a reduced cross-sectional area disposed bearing on said tubing means.

4. A pinch valve assembly according to claim 1 in which said plunger member has an upper end which is chamfered.

5. A pinch valve assembly according to claim 1 in which said valve body includes retaining means for removably attaching said tubing means to said valve body.

6. A pinch valve assembly according to claim 1 in which said guide means comprises a pair of oppositely directed pin members projecting from the surface of said plunger with each of said pin members slideably disposed with respect to said slot formed in said valve body.

7. A pinch valve assembly according to claim 1 in which said pin member is cylindrical.

8. A pinch valve assembly according to claim 1 in which said slot is elongated.

* * * * *